United States Patent [19]

Choma et al.

[11] Patent Number: 5,277,160
[45] Date of Patent: Jan. 11, 1994

[54] INTERNAL COMBUSTION ENGINE WITH DUAL INTAKE PASSAGES SERVICING A SINGLE INTAKE VALVE

[75] Inventors: Michael A. Choma, Dearborn Hts.; Philip W. Husak, Southgate; William F. Stockhausen, Northville, all of Mich.

[73] Assignee: Ford Motor Company, Dearborn, Mich.

[21] Appl. No.: 993,532

[22] Filed: Dec. 21, 1992

[51] Int. Cl.⁵ .................... F02M 35/10; F02F 1/42
[52] U.S. Cl. .................... 123/306; 123/188.14
[58] Field of Search ...... 123/193.5, 188.14, 306, 52.m; 123/308; 123/52

[56] References Cited

U.S. PATENT DOCUMENTS

| | | | |
|---|---|---|---|
| 3,318,292 | 5/1967 | Hideg | 123/306 X |
| 3,408,992 | 11/1968 | Von Seggern et al. | 123/188.14 |
| 3,861,376 | 1/1975 | Ashley | 123/188.14 |
| 4,174,686 | 11/1979 | Shimizu et al. | 123/188.14 |
| 4,196,703 | 4/1980 | Okitsu et al. | 123/188.14 |
| 4,919,092 | 4/1990 | Smith, Jr. et al. | 123/188.14 |
| 4,930,468 | 6/1990 | Stockhausen | 123/188.14 |
| 5,076,224 | 12/1991 | Smith, Jr. et al. | 123/188.14 |

*Primary Examiner*—Willis R. Wolfe
*Attorney, Agent, or Firm*—Jerome R. Drouillard; Roger L. May

[57] ABSTRACT

An internal combustion engine having a single intake valve which is fed fresh charge by primary and secondary port passages has an essentially flat combustion chamber with the spark plug and primary port passages being arranged to achieve a rapid burn rate.

10 Claims, 4 Drawing Sheets

INTERNAL COMBUSTION ENGINE WITH DUAL INTAKE PASSAGES SERVICING A SINGLE INTAKE VALVE

BACKGROUND OF THE INVENTION

This invention relates to an internal combustion engine having a combustion chamber which is optimized for use with a single intake valve which is fed fresh charge by primary and secondary intake port passages.

SUMMARY OF THE INVENTION

An internal combustion engine having a single intake valve and dual intake manifold runners is disclosed in U.S. Pat. No. 4,930,468, which is assigned to the assignee of the present invention. In an engine according to the present invention, a cylinder head defining a combustion chamber and having at least one exhaust poppet valve and a single intake poppet valve for each cylinder, includes a plurality of intake ports for conducting fresh charge to each intake valve. Each of the intake ports extends through the cylinder head and has a dividing wall for separating the port into primary and secondary passages. The primary passages are oriented so as to cause rotational flow about the outermost portion of the cylinder. The secondary passages are oriented so as to cause flow directed about a radially inward portion of the cylinder. The dividing wall is oriented such that in a plan view projected along the centerline of the cylinder bore, the included angle between two lines originating from the cylinder bore center, one of which is normal to the centerline of the dividing wall, as extended through the center of the intake valve stem, and the other of which extends from the cylinder bore center through the center of the intake valve stem, is between 0 degrees and 30 degrees.

The combustion chamber configuration is further defined by the spark plug location. The spark plug is located within the roof of the combustion chamber and is positioned within a 15 degree segment beginning at approximately 97 degrees of counterclockwise rotation, as viewed from above the engine, from a line originating from the cylinder bore centerline, and extending through the center of the intake valve stem.

According to another aspect of the present invention, the intake and exhaust valves are preferably oriented within 5 degrees of parallelism with the centerline of the cylinder, giving the engine a generally flat combustion chamber which is beneficially utilized with a bore-to-stroke ratio in the range of 1 to 1.2.

DESCRIPTION OF THE PREFERRED EMBODIMENTS

Figure 2:
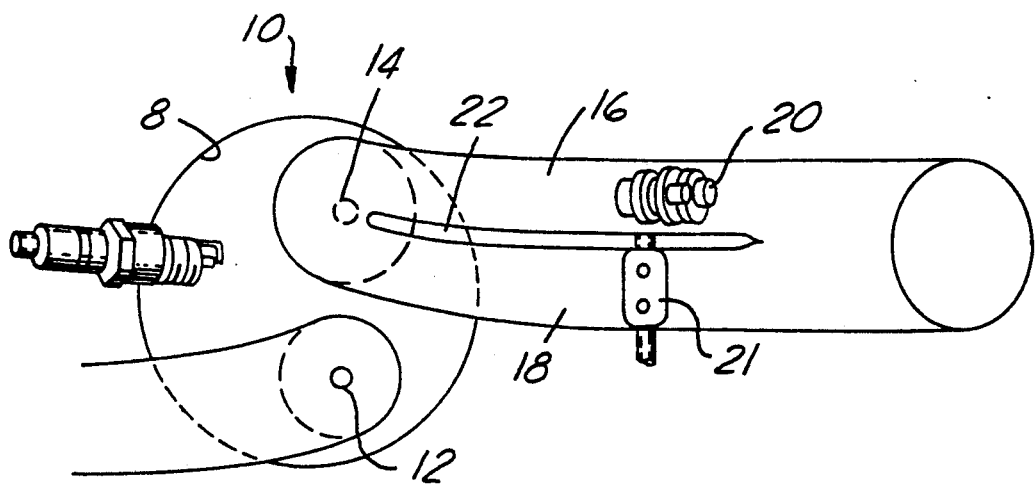
FIG. 2 is a partially schematic plan view of an engine cylinder according to the present invention.
Figure 1:
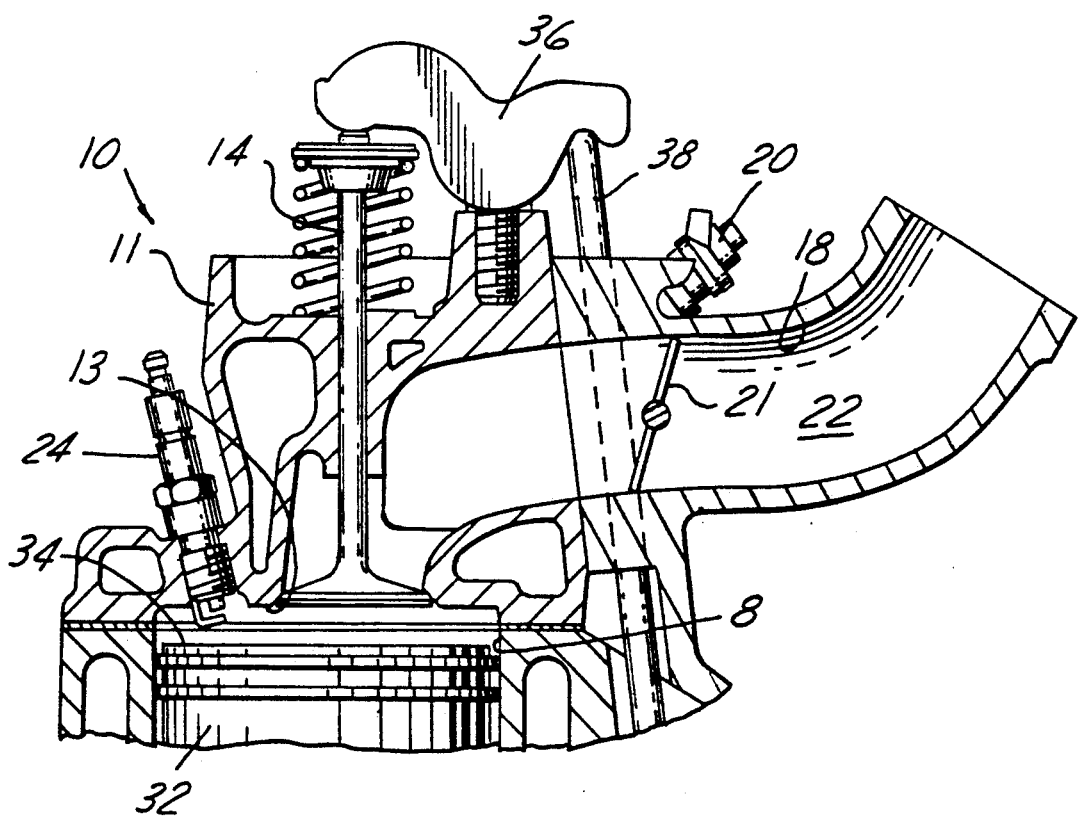
FIG. 1 is a sectional view, partially broken away, of an engine according to the present invention.

As shown in FIGS. 1 and 2, an internal combustion engine 10, having a cylinder, 8, and a cylinder head, 11, has a single exhaust valve having a stem, 12, and a single intake valve having a stem, 14. Although this invention pertains to engines having more than one cylinder, only a single cylinder is shown for the sake of clarity. Fresh charge is conducted to the intake valve by means of an intake port having a primary intake passage 16 and a secondary intake passage 18. The primary and secondary passages are established by a dividing wall, 22, which runs vertically so as to separate the port into the primary and secondary passages. Primary passage 16 is oriented so as to cause rotational flow about the outermost portion of the cylinder, whereas secondary intake passage 18 is oriented so as to cause flow directed about a radially inward portion of the cylinder. Note that a fuel injector, 20, is provided in primary intake passage 16, whereas the secondary intake passage is equipped with a deactivation device, 21, which may be selectively employed for the purpose of occluding secondary intake passage 18. The combustion chamber system is further formed by a spark plug 24, located in the roof, 13, of the combustion chamber. The combustion chamber is further defined by piston 32, which has a flat top, 34. Although FIG. 1 indicates that the engine valves are operated by rocker arms, 36, and pushrods, 38, in conventional fashion, those skilled in the art will appreciate in view of this disclosure that other types of valve actuation systems could be used, including but not limited to overhead camshaft or electrohydraulic camless systems.

Figure 3:
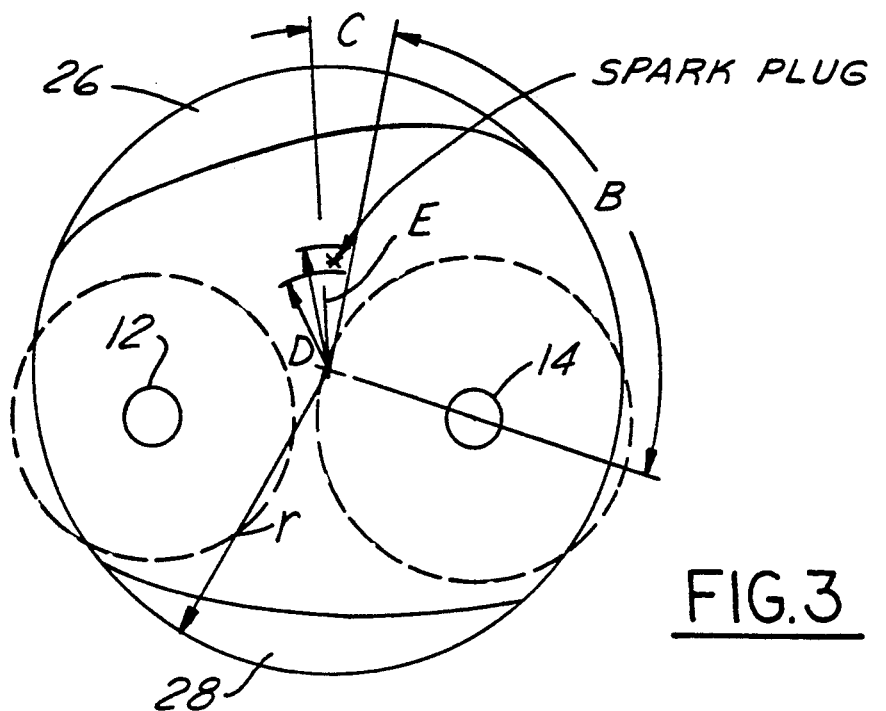
FIG. 3 is a plan view of a dual squish engine combustion chamber according to one aspect of the present invention.

FIG. 3 illustrates a dual squish type of combustion chamber configuration according to the present invention. In conventional fashion, "squish" is defined as the percentage of the cross-sectional area of the cylinder in which the top of the piston and the roof of the combustion chamber, as defined by the cylinder head and valve heads, come into close proximity at top dead center.

Each of the squish areas illustrated in FIG. 3 extends between an intake valve having stem 14 and an exhaust valve having stem 12 such that the two squish areas occupy generally diametrically opposed regions of the combustion chamber. The spark plug (the location of which is marked by an asterisk) is located within a segment, C, at a radial distance D to E from the centerline of the cylinder such that D approximates 15 percent, and E approximates 25 percent, respectively, of the cylinder bore radius, r. It has been determined that the combustion chamber configuration illustrated in FIG. 3 will operate satisfactorily if squish area 26 comprises 9.2 percent of the bore area defined by the radius r, with squish area 28 occupying about 5.7 percent of the bore area.

Figure 4:
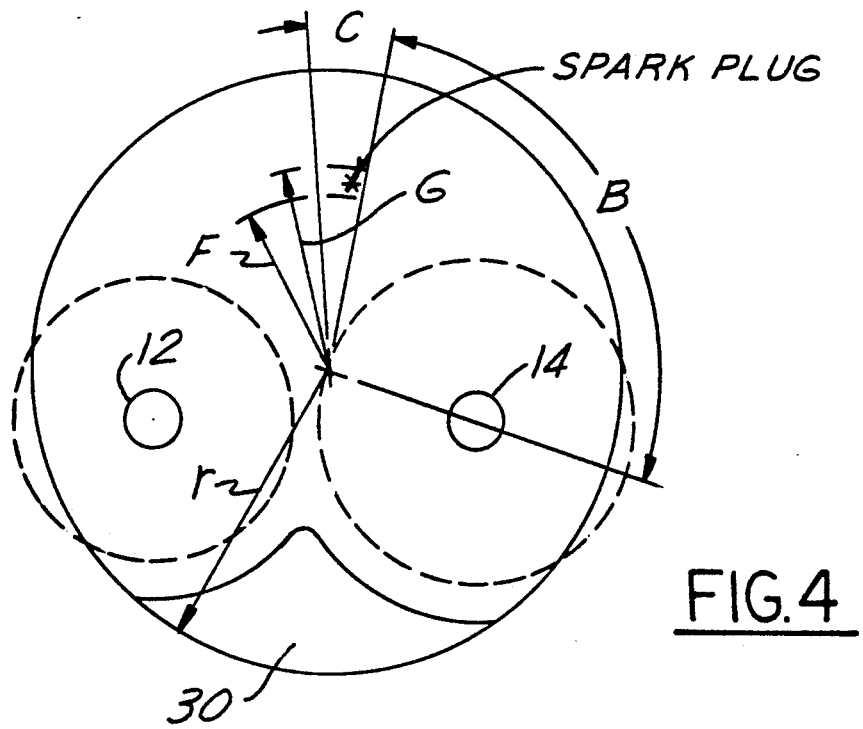
FIG. 4 is a plan view of a single squish engine combustion chamber according to another aspect of the present invention.

The single squish area illustrated in FIG. 4 has an area of about 8.5 percent of the total cylinder bore area. The spark plug is located at the position of the asterisk between the radial values F and G, which approximate 58 percent and 67 percent, respectively, of the cylinder bore radius, r.

Figure 6:
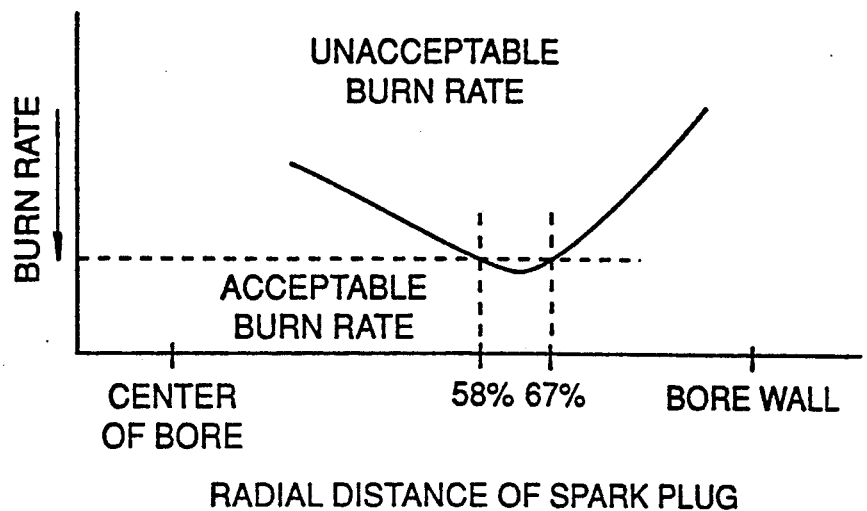
FIG. 6 is a graphical representation of the effect of spark plug location on burn rate with an engine having a combustion chamber according to FIG. 4.
Figure 7:
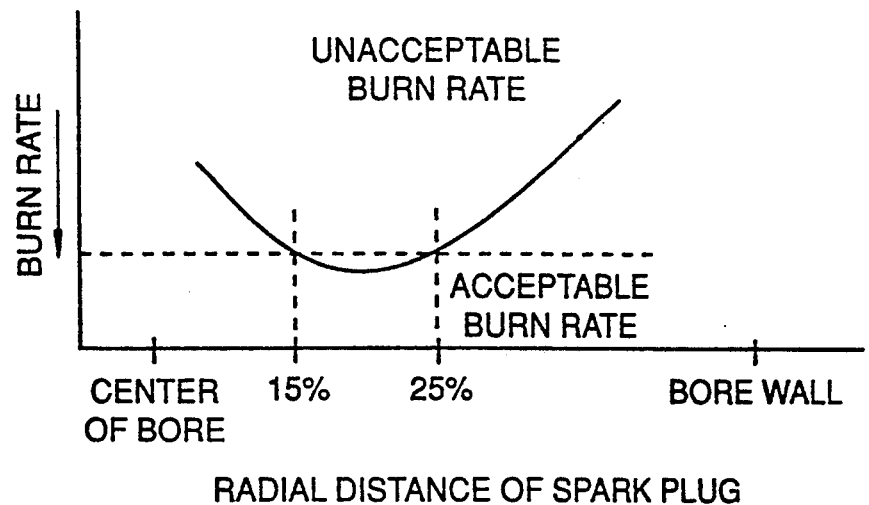
FIG. 7 is a graphical representation of the effect of spark plug location on burn rate with an engine having a combustion chamber according to FIG. 3.

The effect of the radial location of spark plug 24 upon burn rate is illustrated in FIGS. 6 and 7. FIG. 6 deals with the single squish case illustrated in FIG. 4, with radial distance falling on the abscissa and burn rate on the ordinate. Note that burn rate is fastest at the abscissa. As illustrated, the fastest burn rate is achieved when the spark plug is located at a position which is 58 percent to 67 percent of the distance between the centerline of the cylinder and the cylinder wall. Similarly, in FIG. 7, a faster burn rate is achieved when the spark plug is located at a distance extending 15% to 25% from the center of the cylinder bore. High burn rate is desired to minimize octane sensitivity and to promote idle smoothness.

Figure 5:
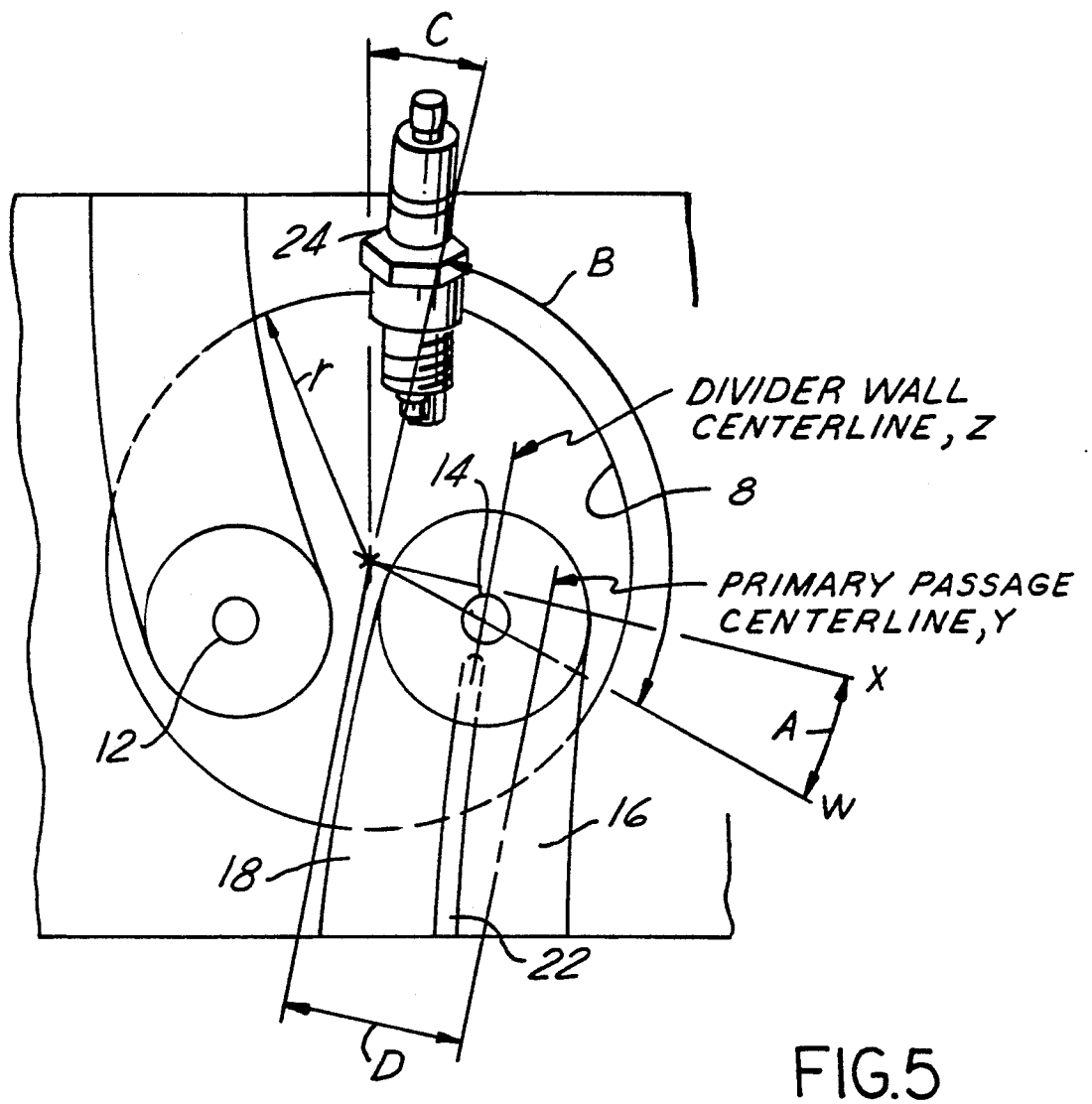
FIG. 5 is a schematic representation of a cylinder of an engine according to the present invention, illustrating geometry for spark plug and intake passage location.

The placement of spark plug 24 with respect to the intake valve and primary intake passage 16 is illustrated in FIG. 5. It has been determined that with spark plug 24 located as illustrated in FIG. 1 within roof 13 of the combustion chamber, the spark plug is ideally located within a 15 degree segment C, which extends from a point defined by arc B, with arc B extending 97 degrees counterclockwise from line W, which originates from the cylinder bore center and extends through the center of intake valve stem 14.

It has further been determined that with an engine having the orientations of valve stems 12 and 14, diverging not more than 5 degrees from parallel with the centerline of cylinder 8, and with the engine having a generally flat combustion chamber defined by cylinder head 11 and the flat top 34 of piston 32, primary intake passages 16 should be oriented as follows. First, as shown in FIG. 5, establish line X, which is normal to the divider wall centerline, Z, with line X passing through the centerline of cylinder 8. Dividing wall centerline Z passes through the center of intake valve stem 14. Then, establish line W, which extends from the cylinder bore centerline through the center of intake valve stem 14. The angle between lines X and W is marked "A". Primary passage 16 should be oriented such that angle A is between 0 degrees and 30 degrees, and primary passage 16 should further be oriented such that the distance D, extending from the centerline of the cylinder to the centerline, Y of primary passage 16 approximates 63% to 76% of the radius of the bore, r.

It has been determined experimentally that a combustion chamber configuration according to the present invention works well with an engine having a bore-to-stroke ratio in the range of 1 to 1.2.

We claim:

1. A multicylinder reciprocating internal combustion engine with a dual induction system, with said engine comprising;
    a cylinder head defining a combustion chamber and having at least one exhaust poppet valve and a single intake poppet valve for each cylinder, with the intake valve being located so as to control the flow of charge into the cylinder;
    a plurality of intake ports for conducting fresh charge to each intake valve, with each of said ports extending through said cylinder head and having a dividing wall for separating the port into primary and secondary passages, with the primary passage being oriented so as to cause rotational flow about the outermost portion of the cylinder, and the secondary passage being oriented so as to cause flow directed about a radially inward portion of the cylinder, and the dividing wall being oriented such that, in a plan view projected along the center line of the cylinder bore, the included angle between two lines originating from the cylinder bore center, one of which is normal to the center line of said dividing wall as extended through the center of the intake valve stem, and the other of which extends from the cylinder bore center through the center of the intake valve stem, is between 0 and 30 degrees; and
    a spark plug located within the roof of the combustion chamber, with said spark plug being positioned within a 15 degree segment beginning at approximately 97 degrees of counterclockwise rotation, as viewed from above said engine, from a line originating from the cylinder bore center line and extending through the center of the intake valve stem.

2. An engine according to claim 1, wherein said combustion chamber has a single squish area extending between the intake and exhaust valves on the opposite side of the combustion chamber from said spark plug and extending radially inwardly from the outer periphery of the combustion chamber, with said spark plug being located within said 15 degree segment at a radial distance from the center line of the cylinder which approximates 58 to 67 percent of the cylinder bore radius.

3. An engine according to claim 2, wherein said squish area occupies approximately 8.5 percent of the cross-sectional area of the cylinder bore.

4. An engine according to claim 1, wherein said combustion chamber has two squish areas extending between the intake and exhaust valves within generally diametrically opposed regions of the combustion chamber, with said spark plug being located within said 15 degree segment at a radial distance from the center line of the cylinder, which approximates 15 to 25 percent of the cylinder bore radius.

5. An engine according to claim 4, wherein said squish areas occupy approximately 14.9 percent of the cross-sectional area of the cylinder bore.

6. An engine according to claim 1, wherein said intake and exhaust valves are oriented within 5 degrees of parallelism with the centerline of the cylinder and wherein said engine has a generally flat combustion chamber, with said engine further having a bore to stroke ratio in the range of 1 to 1.2.

7. An engine according to claim 1, wherein the center line of said primary intake passage is displaced from the cylinder bore center at a distance approximating 63 to 76 percent of the cylinder bore radius.

8. A multicylinder reciprocating internal combustion engine with a dual induction system, with said engine comprising:
    a cylinder head and piston together defining a generally flat combustion chamber, with said cylinder head having at least one exhaust poppet valve and a single intake poppet valve for each cylinder, with the intake valve being located so as to control the flow of charge into the cylinder, and with the intake and exhaust valves being oriented within 5 degrees of parallelism with the centerline of the cylinder;
    a plurality of intake ports for conducting fresh charge to each intake valve, with each of said ports extending through said cylinder head and having a dividing wall for separating the port into primary and secondary passages, with the primary passage being oriented so as to cause rotational flow about the outermost portion of the cylinder, and the secondary passage being oriented so as to cause flow directed about a radially inward portion of the cylinder, and the dividing wall being oriented such that, in a plan view projected along the center line of the cylinder bore, the included angle between two lines originating from the cylinder bore center, one of which is normal to the center line of said dividing wall as extended through the center of the intake valve stem, and the other of which extends from the cylinder bore center through the center of the intake valve stem, is between 0 and 30 degrees; and a spark plug located within the combustion chamber, with said spark plug being positioned within a 15 degree segment beginning at approximately 97 degrees of counterclockwise rotation, as viewed from above said engine, from a line originating from the cylinder bore center line and extending through the center of the intake valve stem.

9. An engine according to claim 8, with said engine having a bore to stroke ratio in the range of 1 to 1.2.

10. An engine according to claim 8, wherein the center line of said primary intake passage is displaced from the cylinder bore center at a distance approximating 63 to 76 percent of the cylinder bore radius.

* * * * *